(12) United States Patent
Lin

(10) Patent No.: US 10,165,474 B2
(45) Date of Patent: Dec. 25, 2018

(54) VOLUNTEER DOMAIN CHANGE OF EXISTED SERVICE FOR SUPPORTING MULTIPLE SERVICES WITH SERVICE CONTINUITY

(71) Applicant: MEDIATEK INC., Hsinchu (TW)

(72) Inventor: Zong-Syun Lin, Kaohsiung (TW)

(73) Assignee: MEDIATEK INC., Hsinchu (TW)

( * ) Notice: Subject to any disclaimer, the term of this patent is extended or adjusted under 35 U.S.C. 154(b) by 66 days.

(21) Appl. No.: 15/200,660

(22) Filed: Jul. 1, 2016

(65) Prior Publication Data

US 2018/0007588 A1 Jan. 4, 2018

(51) Int. Cl.
*H04W 36/00* (2009.01)
*H04W 24/10* (2009.01)
*H04W 76/18* (2018.01)
*H04W 76/15* (2018.01)

(52) U.S. Cl.
CPC ....... *H04W 36/0022* (2013.01); *H04W 24/10* (2013.01); *H04W 36/0027* (2013.01); *H04W 76/15* (2018.02); *H04W 76/18* (2018.02)

(58) Field of Classification Search
None
See application file for complete search history.

(56) References Cited

U.S. PATENT DOCUMENTS

| | | | | |
|---|---|---|---|---|
| 6,907,245 B2 * | 6/2005 | Ohlsson | ................ | H04W 36/18 370/331 |
| 8,504,043 B2 * | 8/2013 | Wu | ................... | H04W 36/0022 370/331 |
| 8,886,194 B2 * | 11/2014 | Hyun | ................... | H04W 36/22 455/436 |
| 8,929,284 B2 * | 1/2015 | Song | ................ | H04W 36/0033 370/328 |
| 9,723,534 B2 * | 8/2017 | Lee | ................... | H04W 36/0066 |
| 2012/0057569 A1 * | 3/2012 | Xie | ................... | H04W 36/0022 370/331 |
| 2016/0219474 A1 * | 7/2016 | Singh | ................ | H04W 36/0083 |
| 2016/0219644 A1 * | 7/2016 | Zhao | ................... | H04W 76/028 |
| 2016/0226925 A1 * | 8/2016 | Chebolu | ............. | H04L 65/1069 |
| 2017/0094565 A1 * | 3/2017 | Sharma | ............... | H04W 76/027 |
| 2017/0223148 A1 * | 8/2017 | Roeland | .................. | H04L 69/08 |
| 2017/0265116 A1 * | 9/2017 | McCann | ............... | H04W 36/22 |
| 2017/0295530 A1 * | 10/2017 | Chen | ..................... | H04W 36/14 |

* cited by examiner

*Primary Examiner* — Eunsook Choi
(74) *Attorney, Agent, or Firm* — Oblon, McClelland, Maier & Neustadt, L.L.P.

(57) ABSTRACT

A method of performing volunteer domain-change to support multiple services with service continuity in a heterogeneous network is proposed. A user equipment (UE) establishes a first connection for transmitting and receiving voice or data in a first service domain in a heterogeneous network. The UE is equipped with one or multiple radio frequency (RF) transceivers. The UE triggers a volunteer domain-change of the first connection from the first service domain to a second service domain based on a detected condition. The detected condition indicates that a second connection is not supported in the first service domain, establishing the second connection failed in the first service domain, or establishing the second connection is predicted to fail in the first service domain. The UE then establishes the second connection for transmitting and receiving voice or data in the second service domain while simultaneously continuing the first connection without service interruption.

21 Claims, 5 Drawing Sheets

VOLUNTEER DOMAIN CHANGE OF EXISTED SERVICE FOR SUPPORTING MULTIPLE SERVICES WITH SERVICE CONTINUITY

TECHNICAL FIELD

The disclosed embodiments relate generally to wireless communication, and, more particularly, to method of volunteer domain change for supporting multiple services with service continuity.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). The $3^{rd}$ generation partner project (3GPP) network normally includes a hybrid of 2G/3G/4G systems. With the optimization of the network design, many improvements have developed over the evolution of various standards.

The exponential growth of mobile subscribers requires substantial increase of network capacity. However, the capacity of a given network access technology network is limited by the laws of physics. The current cellular network deployed, such as 3G, LTE, LTE-A, suffers from limited licensed spectrum availability restraining the potential capacity increase. Small cell technologies, such as Wi-Fi WLAN is ideally positioned to extend the current cellular network capacity. Wi-Fi appeals to many operators as a cost-effective mean of offloading large amounts of mobile data traffic especially indoor where most of the traffic is generated. Operators are already taking advantage of devices supporting Wi-Fi as a tool to meet capacity demands by letting the user offload manually its traffic on standalone networks.

IP Multimedia Subsystem (IMS) is an architectural frame for delivering IP multimedia services. Historically, mobile phones have provided voice call services over a circuit-switched (CS) network, rather than strictly over an IP packet-switched (PS) network. Alternative methods or delivering voice or other multimedia services over IP have become available on smartphones (e.g. VoIP or Skype), but they have not become standardized across the industry. IMS is an architectural framework to provide such standardization.

IMS is a new way to dial PS call on LTE/Wi-Fi instead of fallback to 2G/3G legacy CS call. Operators plan to support Voice over IP (VoLTE) or Wi-Fi connection (WFC) features y stages. As a result, VoLTE/WFC features in PS domain are not able to support all services in CS domain now. For example, emergency call, supplementary service, SMS over IMS, etc., these services are not supported for some operators in PS domain now. Even for the same operator, the capability of VoLTE and WFC may be different in different region. Similarly, for data services, different radio access technologies (RATs) of 2G/3G/4G/WiFi may support different data services in different region.

When a user equipment (UE) accesses a service on one domain failed, the UE can retry the service on other domain. However, if there is an existing service and UN tries to access a second service on the same domain and encounters error, then the UE may not able to retry the failed service on the other domain because the first service still exists and needs to communicate with the network continuously. Otherwise, service interruption is introduced to the existing service. This is particularly important to UEs that are equipped with a single radio frequency (RF) transceiver module. In such case, the UN can only establish multiple services on the same domain. Even with multiple RF transceiver modules, the same problem may exist if the network does not provide multiple services via different RATS.

A solution is sought.

SUMMARY

A method of performing volunteer domain-change to support multiple services with service continuity in a heterogeneous network is proposed. A user equipment (UE) establishes a first connection for transmitting and receiving voice or data in a first service domain in a heterogeneous network. The UE is equipped with one or multiple radio frequency (RF) transceivers. The UE triggers a volunteer domain-change of the first connection from the first service domain to a second service domain based on a detected condition. The detected condition indicates that a second connection is not supported in the first service domain, establishing the second connection failed in the first service domain, or establishing the second connection is predicted to fail in the first service domain. The UE establishes the second connection for transmitting and receiving voice or data in the second service domain while simultaneously continuing the first connection without service interruption.

For voice calls, the first service domain and the second service domain comprise one of a circuit-switch (CS) service domain, a packet-switch (PS) service domain, and a Wi-Fi service domain. For data services, the first service domain and the second service domain comprise one of a LTE service domain, a 2G/3G service domain, and a Wi-Fi service domain. In one embodiment, the detected condition involves the UE fails to establish the second connection in the first service domain. In another embodiment, the detected condition involves the UE detects that the second connection is predict to fail in the first service domain. Such prediction may be based on network capability information or based on network broadcasting information indicating the network is busy.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
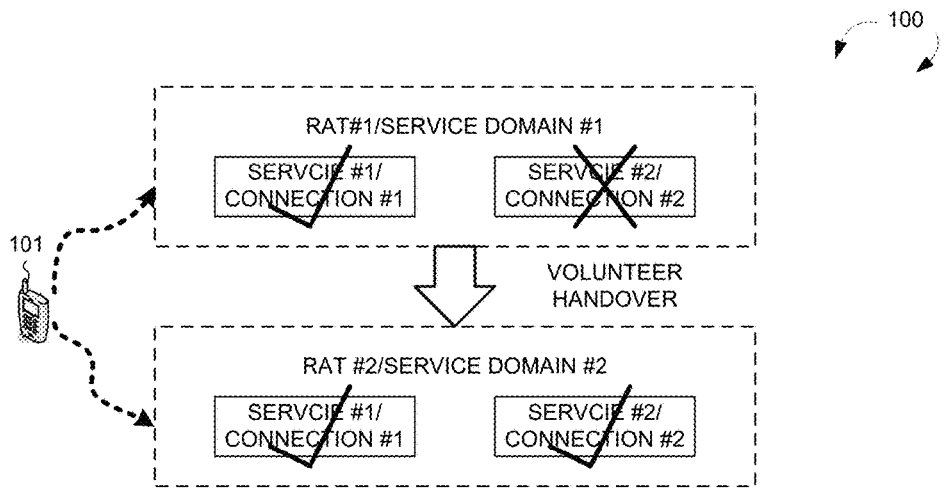
FIG. 1 illustrates an exemplary heterogeneous network with multiple RATs and service domains and a user equipment (UE) performing volunteer domain change to support multiple services with service continuity in accordance with one novel aspect.

FIG. 1 illustrates an exemplary heterogeneous network 100 with multiple RATs and service domains and a user equipment (UE 101) performing volunteer domain change to support multiple services with service continuity in accordance with one novel aspect. Heterogeneous network 100 supports different services/connections through different radio access technologies (RATs) (e.g., RAM#1 and RAT#2) or different service domains (e.g., service domain #1 and service domain #2). UE 101 may be equipped with a single radio frequency (RF) module/transceiver or multiple RF modules/transceivers for services via different RATs/service domains. UE 101 may be a smart phone, a wearable device, an Internet of Things (IoT) device, a tablet, etc. The services may be IP services. Here, a service may include voice services such as normal call, emergency call, supplementary service and data services includes short message service (SMS) and other data services (e.g., web browsing and file transfer on the Internet). Note that under the same RAT, there may exist multiple service domains. Similarly, under the same service domain, there may exist multiple RATs. For the purpose of this invention, RATs and service domains together are commonly referred to as service domains. Specifically, for voice service, a service domain may include circuit-switched (CS) service domain, packet-switched (PS) service domain, and IMS service domain. For data service, a service domain may include different RATs of 2G/3G/4G and Wi-Fi technology.

IP Multimedia Subsystem (IMS) is a new way to dial PS call on LTE/Wi-Fi instead of fallback to 2G/3G legacy CS call. However, VoLTE/WFC features in PS domain may not be able to support all services in CS domain. Even for the same operator, the capability of VoLTE and WFC may be different in different region. In general, when a UE accesses a service on one domain failed, the UE can retry the service on other domain. However in FIG. 1, if there is an existing service #1 and UE 101 tries to access a second service #2 in the same domain #1 and encounters error, then UE 101 may not able to retry the failed service on domain #2 because the first service #1 still exists and needs to communicate with the network continuously. Otherwise, service interruption is introduced to the existing service #1. This is import t an to UEs that are equipped with a single radio frequency (RF) transceiver module. In such case, the UE can only establish multiple services or connections on the same service domain. Even with multiple RF transceiver modules, the same problem may exist if the network does not provide multiple services or connections via different RATs.

In accordance with one novel aspect, a method of volunteer domain-change initiated by the UE to support multiple services/connections and maintain service continuity is proposed. In the example of FIG. 1, UE 101 may establish a first connection for transmitting and receiving IP packets associated with service #1 in domain #1. Later on, UE 101 may detect that a second connection associated with service #2 cannot be supported in domain #1. Accordingly, UE 101 may trigger volunteer handover the existing connection #1 to domain #2, which supports the second service #2. As a result, UE 101 can have both connection #1 and connection. #2 to support service #1 and service #2 simultaneously in domain #2 while maintain service continuity for service #1. For the purpose of this invention, the term service and connection can be used interchangeably.

Figure 2:
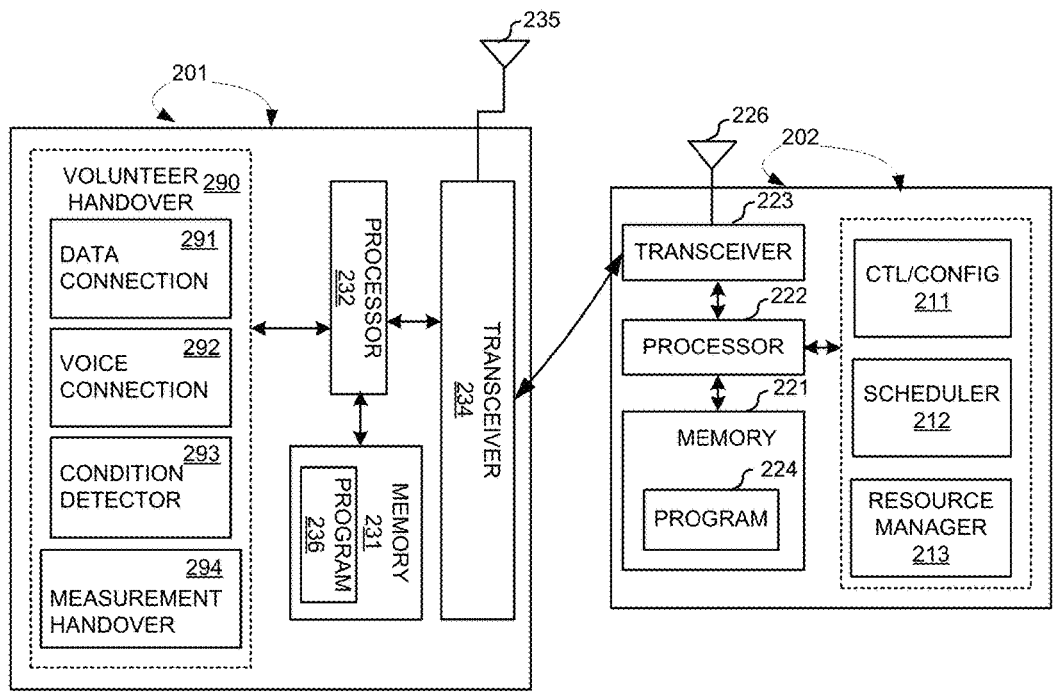
FIG. 2 illustrates simplified block diagrams of a user equipment (UE) and a base station (BS) in accordance with embodiments of the current invention.

FIG. 2 illustrates simplified block diagrams of a user equipment UE 201 and a base station or access point BS/AP 202 in accordance with embodiments of the current invention. BS/AP 202 may have an antenna 226, which may transmit and receive radio signals. RF transceiver module 223, coupled with the antenna, may receive RF signals from antenna 226, convert them to baseband signals and send them to processor 222. RF transceiver 223 may also convert received baseband signals from processor 222, convert them to RF signals, and send out to antenna 226. Processor 222 may process the received baseband signals and invoke different functional modules to perform features in BS/AP 202. Memory 221 may store program instructions and data 224 to control the operations of BS/AP 202. BS/AP 202 may also include a set of control circuits, such as a control and configuration circuit 211, a scheduler 212, and a resource manager 213 that may carry out functional tasks and features in the network.

Similarly, UE 201 has an antenna 235, which may transmit and receive radio signals. RF transceiver module 234, coupled with the antenna, may receive RF signals from antenna 235, convert them to baseband signals and send them to processor 232. RF transceiver 234 may also convert received baseband signals from processor 232, convert them to RF signals, and send out to antenna 235. Processor 232 may process the received baseband signals and invoke different functional modules to perform features in the UE 201. Memory 231 may store program instructions and data 236 to control the operations of the UE 201.

UE 201 may also include a set of control circuits that may carry out functional tasks of the present invention. A volunteer handover module 290 may trigger volunteer handover initiated by the single-RF UE to support multiple services and maintain service continuity. Volunteer handover module 290 may further comprise a data connection circuit 291 that may establish data connection for data services, a voice connection circuit 292 that may establish voice connection for voice calls, a condition detector 293 that may detect whether a specific service or connection can be supported in a specific RAT or service domain, and a measurement and handover circuit 294 that may perform measurements and may handle handover functions with the network.

Figure 3:
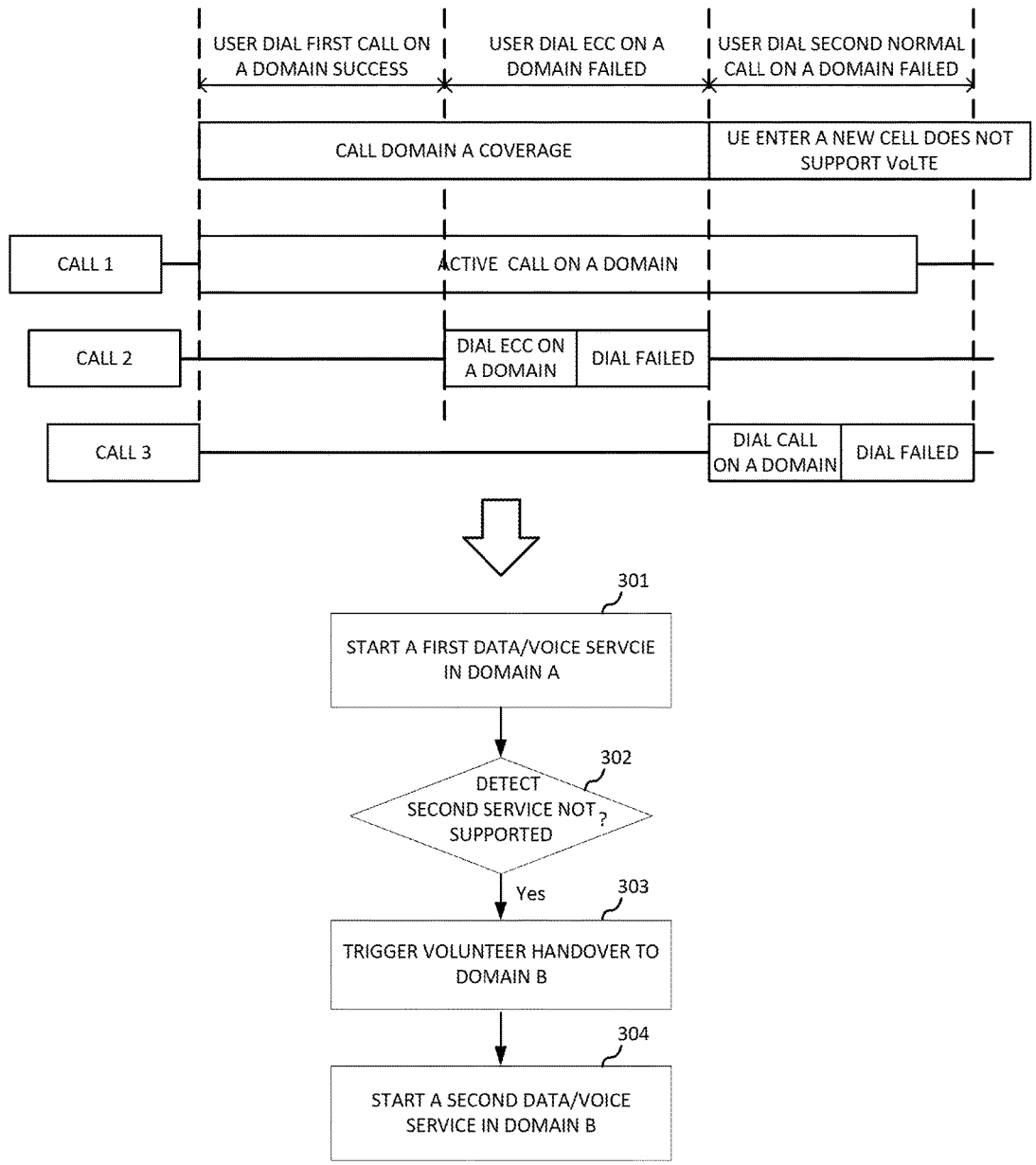
FIG. 3 illustrates a proposed method of volunteer domain change to support multiple services in accordance with embodiments of the current invention.

FIG. 3 illustrates a proposed method of volunteer domain change to support multiple services in accordance with embodiments of the current invention. In the example of FIG. 3, a user may be originally located in a region of the network that supports one service domain: domain A for VoLTE service. A UE has an existed VoLTE call can try to access a second service on the same domain A. However, the second service access may be failed due to network capability. As depicted in FIG. 3, the user may dial a first VoLTE call (call 1) on domain A and succeeds. Call 1 may remain active on domain A. In a first scenario, the user may later dial an emergency call (ECC) (call 2) on domain A and may fail. This is because the network may not support emergency VoLTE call. In a second scenario, the user may later enter a new cell that does not support VoLTE service. This may not affect the existed VoLTE call 1. However, when the user tries to dial another VoLTE call (call 3), the call may fail because the new cell does not support VoLTE service. As a result, as long as the existed VoLTE call in domain A is active, the user may no longer be able to dial additional VoLTE calls that are not supported by the network in domain A.

To solve this issue, a volunteer domain-change mechanism is provided to support multiple services while maintaining service continuity of existing service. In step 301, a UE may start a first data/voice service in domain A. In step 302, the UE may detect whether a second service is supported by the network in domain A or whether the second service can be successfully established in domain A. Such detection may involve 1) the UE tries to establish the second service in domain A but failed, e.g., the network does not support or is too busy; and 2) the UE predicts that establishing the second service in domain A will fail, e.g., indicated by the network capability or by broadcasted information. If the second service is not supported or cannot be successfully established, in step 303, the UE may trigger volunteer domain change to another domain B. The UE may continue to receive the first service in domain B, which also supports the second service. In step 304, the UE may also start the second data/voice service in domain B. As a result, the UE can simultaneously receive both the first service and the second service in domain B. In one example, the volunteer domain change involves a volunteer handover from one RAT to another RAT. For the purpose of this invention, the term domain change and handover are used interchangeably, referring to a volunteer switch from a first service domain to a second service domain.

Figure 4:
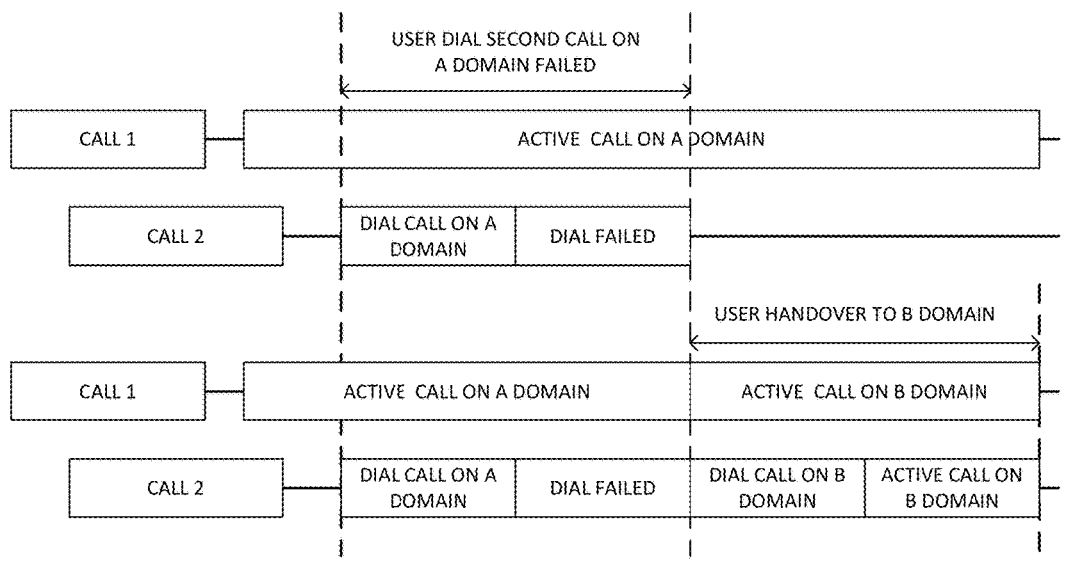
FIG. 4 illustrates a first embodiment of detecting service failure and triggering volunteer handover in accordance with embodiments of the current invention.

FIG. 4 illustrates a first embodiment of detecting service failure and triggering volunteer handover in accordance with embodiments of the current invention. In the example of FIG. 4, the triggering of volunteer handover may be based on a detected condition that a second service is not supported in the same domain that provides the first service. The user may dial call 1 on domain A and call 1 remains active on domain A. Later, the user may dial call 2 on domain A but failed. Upon detecting such failure, the user may handover to another domain B. As a result, call 1 may remain active on domain B. In addition, the user may dial call 2 on domain B and call 2 may also become active on domain B.

Figure 5:
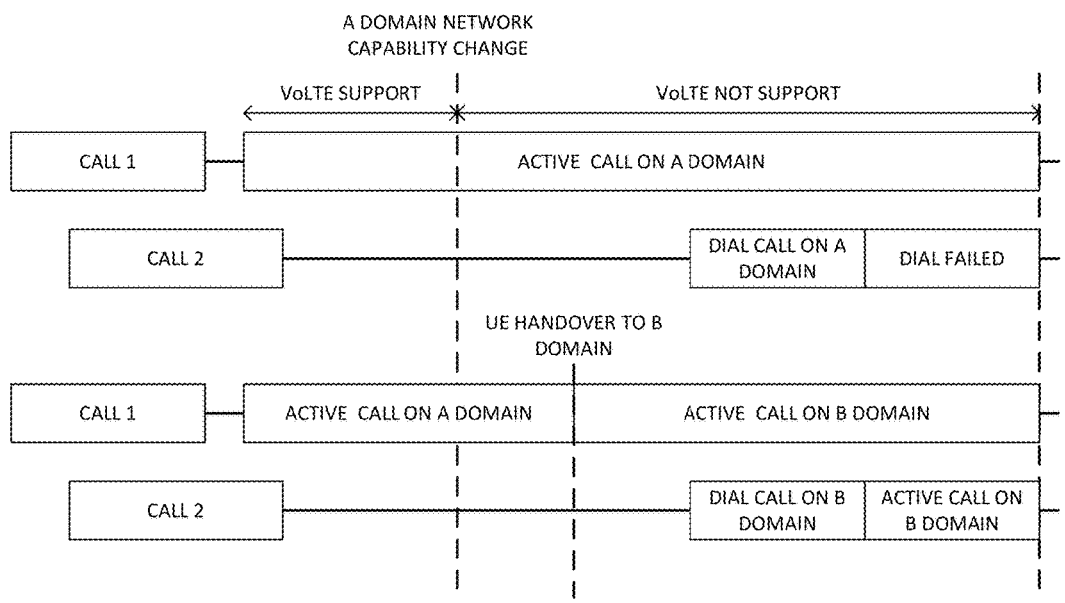
FIG. 5 illustrates a second embodiment of detecting network capability change and triggering volunteer handover in accordance with embodiments of the current invention.

FIG. 5 illustrates a second embodiment of detecting service failure and triggering volunteer handover in accordance with embodiments of the current invention. In the example of FIG. 5, the triggering of volunteer handover may be based on a detected condition that the network capability has changed for supporting a desired service to the user. The user may dial call 1 on domain A and call 1 remains active on domain A. Later, the user may enter a new cell where the network no longer supports the same service. Without volunteer handover, the user may dial call 2 on domain A but failed. In accordance with one novel aspect, upon detecting the network capability change, the UE may handover to another domain B. As a result, call 1 may remain active on domain B. In addition, the user may dial call 2 on domain B and call 2 may also become active on domain B. In this embodiment, the UE may trigger volunteer handover to proactively prevent the current or other service access failure when network capability changes. If the network capability changes and may make the service access fail, then UE may trigger volunteer handover to other domain with the existed service. In one example, IMS VoLTE indicator may change from supported to not supported, UE then may detect that IMS voice service is not available. In another example, when UE moves from a VoLTE supported network to a VoLTE non-supported network based on UE location information, then UE may handover to Wi-Fi and transfer the existed call to WFC, or the UE may handover to 2G/3G CS domain by triggering SRVCC to 2G/3G.

Figure 6:
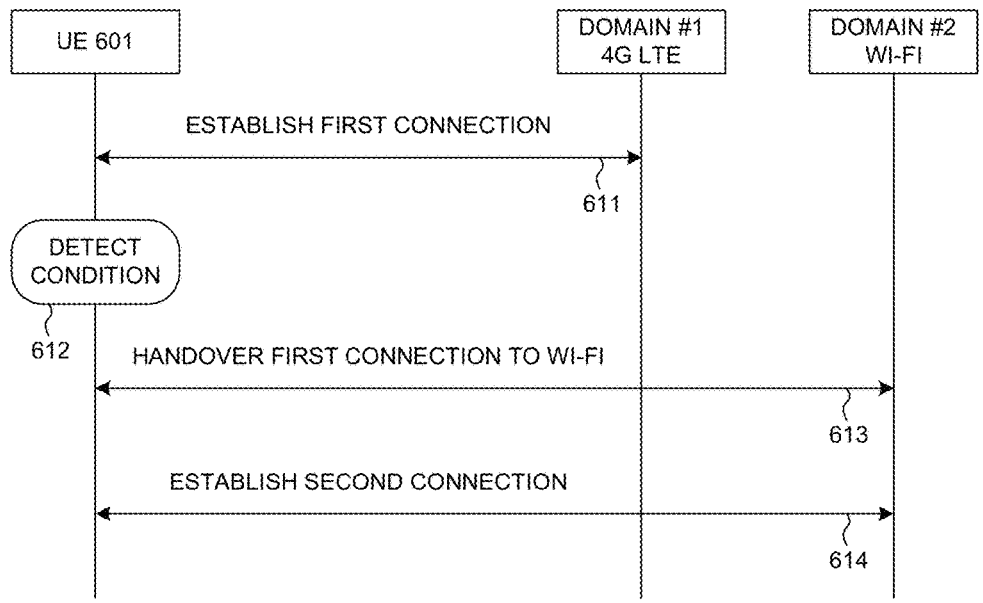
FIG. 6 illustrates one embodiment of volunteer handover from 4G service domain to Wi-Fi service domain in accordance with a novel aspect.

FIG. 6 illustrates one embodiment of volunteer handover from 4G service domain to Wi-Fi service domain in accordance with a novel aspect. In the example of FIG. 6, UE 601 may be located in a wireless network that supports both LTE service domain and Wi-Fi service domain. In step 611, UE 601 may establish a first connection associated with a first service in LTE domain. In step 612, UE 601 may detect a condition that a desired second service is not supported in LTE. Upon such detection, in step 613, UE 601 may trigger volunteer handover to Wi-Fi domain and transfer the first connection to WFC. In step 614, UE 601 may establish a second connection associated with a second service in Wi-Fi domain.

Figure 7:
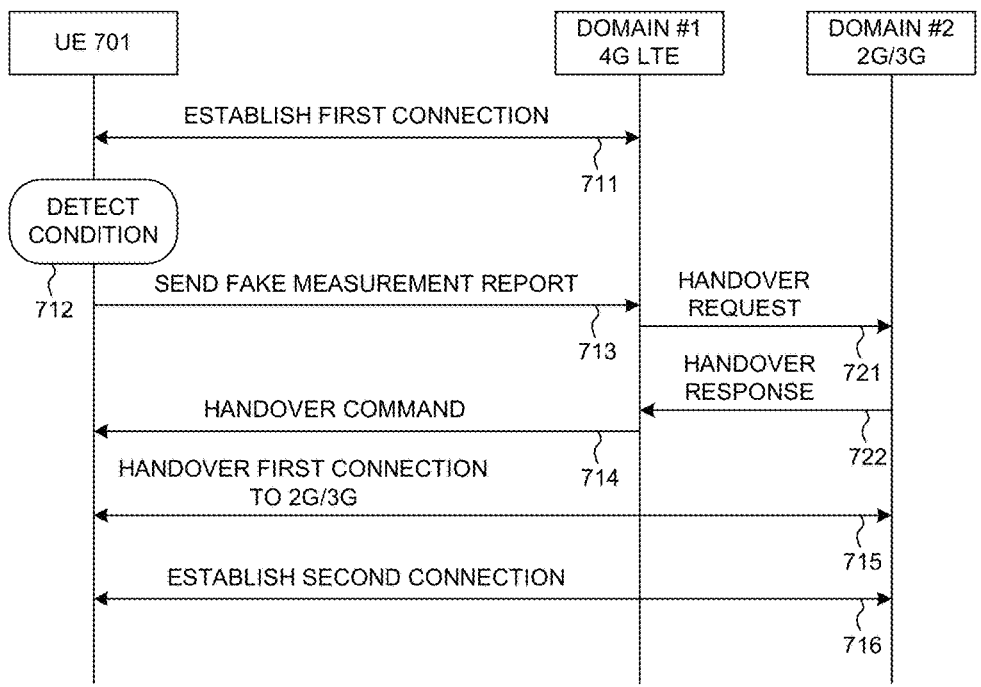
FIG. 7 illustrates one embodiment of volunteer handover from 4G service domain to 2G/3G service domain in accordance with a novel aspect.

FIG. 7 illustrates one embodiment of volunteer handover from LTE service domain to 2G/3G service domain in accordance with a novel aspect. In the example of FIG. 7, UE 701 located in a wireless network that supports both LTE service domain and 2G/3G service domain. In step 711, UE 701 may establish a first connection associated with a first service in LTE domain. In step 712, UE 701 detects a condition that a desired second service is not supported in LTE. Upon such detection, in step 713, UE 701 may trigger volunteer handover to the 2G/3G service domain. The volunteer handover may be triggered using different methods. For example, UE 701 may directly send a handover request to the network. In another example as depicted in FIG. 7, in step 713, UE 701 may send a fake measurement report to the source base station in 4G domain. For instance, the fake measurement report may indicate that the received radio signal strength or quality in the current serving cell is less than a predefined threshold for triggering handover. As a result, the source base station in 4G domain may send a handover request to a target base station in 2G/3G domain (step 721). The target base station may then reply with a handover response (step 722). In step 714, the source base station may send a handover command to UE 701 for handover. In step 715, UE 701 may handover the first connection to the target base station in 2G/3G domain. In step 716, UE 701 may establish a second connection associated with a second service in 2G/3G domain.

Figure 8:
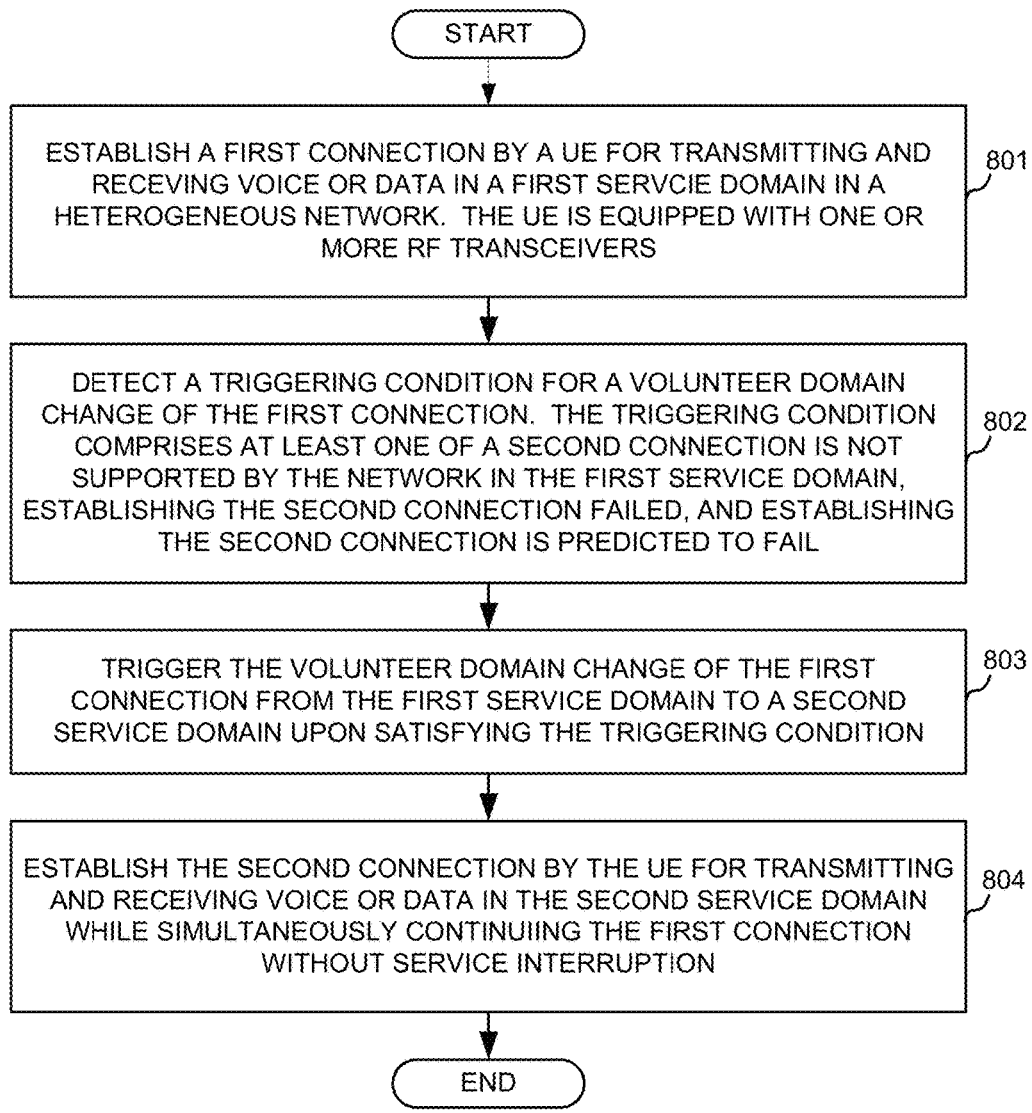
FIG. 8 is a flow chart of a method of performing volunteer handover to support multiple services with service continuity in a heterogeneous network in accordance with one novel aspect.

FIG. 8 is a flow chart of a method of performing volunteer handover to support multiple services with service continuity in a heterogeneous network in accordance with one novel aspect. In step 801, a user equipment (UE) may establish a first connection for transmitting and receiving voice or data in a first service domain in a heterogeneous network. The UE is equipped with one or more radio frequency (RF) transceivers. In step 802, the UE may detect a triggering condition for a volunteer domain change of the first connection. The triggering condition comprises one of a second connection is not supported by the network in the first service domain, establishing the second connection failed in the first service domain, and establishing the second connection is predicted to fail in the first service domain. In step 803, the UE may trigger a volunteer domain-change of the first connection from the first service domain to a second service domain upon satisfying the triggering condition. In step 804, the UE may establish the second connection for transmitting and receiving voice or data in the second service domain while simultaneously continuing the first connection without service interruption.

For voice calls, the first service domain and the second service domain comprise one of a circuit-switch (CS) service domain, a packet-switch (PS) service domain, and a Wi-Fi service domain. For data services, the first service domain and the second service domain comprise one of a LTE service domain, a 2G/3G service domain, and a Wi-Fi service domain. In one embodiment, the detected condition involves the UE fails to establish the second connection in the first service domain. In another embodiment, the detected condition involves the UE detects that the second connection is predict to fail in the first service domain. Such prediction may be based on network capability information or based on network broadcasting information indicating the network is busy.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   establishing a first call between a user equipment (UE) and a heterogeneous network in a first service domain of the heterogeneous network for transmitting and receiving voice or data, wherein the UE is equipped with one or more radio frequency (RF) transceivers;
   detecting, by the UE, a triggering condition for a volunteer domain change of the first call, wherein the triggering condition comprises at least one of establishing a second call between the UE and the heterogeneous network being not supported by the heterogeneous network in the first service domain, having failed to establish the second call in the first service domain, and establishing the second call being predicted to fail in the first service domain; and
   triggering, by the UE in response to detection of the triggering condition, the volunteer domain change of the first call from the first service domain to a second service domain of the heterogeneous network.

2. The method of claim 1, further comprising:
   establishing the second call by the UE for transmitting and receiving voice or data in the second service domain whiling simultaneously continuing the first call without service interruption.

3. The method of claim 1, wherein the first service domain and the second service domain comprise one of a circuit-switch (CS) service domain, a packet-switch (PS) service domain, and a Wi-Fi service domain for voice calls.

4. The method of claim 1, wherein the first service domain and the second service domain comprise one of a LTE service domain, a 2G/3G service domain, and a Wi-Fi service domain for data services.

5. The method of claim 1, wherein the volunteer domain change is triggered while the received signal power or quality of the first call is above a handover threshold.

6. The method of claim 1, wherein the detecting the triggering condition comprises detecting whether the second call is supported in the first service domain based on network capability information.

7. The method of claim 1, wherein the first call is for a voice call service, wherein the first service domain is a packet-switched (PS) service domain that does not support the second call.

8. The method of claim 7, wherein the second service domain is a circuits-switched (CS) service domain that supports the second call.

9. The method of claim 8, wherein the first call is for a Voice over LTE (VoLTE) call service, and wherein the second call is for an emergency call (ECC) service.

10. The method of claim 8, wherein the UE sends a fake measurement report for triggering the volunteer domain change to the CS service domain.

11. A user equipment (UE), comprising:
    a radio frequency (RF) transceiver configured to transmit and receive voice or data over a first established call between the UE and a heterogeneous network in a first service domain of the heterogeneous network; and
    a processing circuit configured to:
       detect a triggering condition for volunteer domain change, wherein the triggering condition comprises at least one of establishing a second call between the UE and the heterogeneous network being not supported by the heterogeneous network in the first service domain, having failed to establish the second call in the first service domain, and establishing the second call being predicted to fail in the first service domain; and
       trigger, in response to detection of the triggering condition, a volunteer domain change of the first call from the first service domain to a second service domain of the heterogeneous network.

12. The UE of claim 11, wherein the UE establishes the second call for transmitting and receiving voice or data in the second service domain whiling simultaneously continuing the first call without service interruption.

13. The UE of claim 11, wherein the first service domain and the second service domain comprise one of a circuit-switch (CS) service domain, a packet-switch (PS) service domain, and a Wi-Fi service domain for voice calls.

14. The UE of claim 11, wherein the first service domain and the second service domain comprise one of a LTE service domain, a 2G/3G service domain, and a Wi-Fi service domain for data services.

15. The UE of claim 11, wherein the volunteer domain change is triggered while the received signal power or quality of the first call is above a handover threshold.

16. The UE of claim 11, wherein the processing circuit is further configured to detect whether the second call is supported in the first service domain based on network capability information.

17. The UE of claim 11, wherein the first call is for a voice call service, wherein the first service domain is a packet-switched (PS) service domain that does not support the second call.

18. The UE of claim 17, wherein the second service domain is a circuits-switched (CS) service domain that supports the second call.

19. The UE of claim 18, wherein the first call is for a Voice over LTE (VoLTE) call service, and wherein the second call is for an emergency call (ECC) service.

20. The UE of claim 18, wherein the UE sends a fake measurement report for triggering the volunteer domain change to the CS service domain.

21. A system, comprising:
    a first network device in a first service domain of a heterogeneous network;

a second network device in a second service domain of the heterogeneous network; and a user equipment (UE) that includes:

a transceiver configured to transmit and receive voice or data over a first established call between the UE and the heterogeneous network in the first service domain of the heterogeneous network via the first network device; and a processing circuit configured to:

detect a triggering condition for volunteer domain change, wherein the triggering condition includes at least one of establishing a second call between the UE and the heterogeneous network being not supported by the heterogeneous network in the first service domain, having failed to establish the second call in the first service domain, and establishing the second call being predicted to fail in the first service domain; and trigger, in response to detection of the triggering condition, a volunteer domain change of the first call from the first service domain to the second service domain of the heterogeneous network via the second network device.

* * * * *